United States Patent [19]

Fischler et al.

[11] Patent Number: 4,894,734
[45] Date of Patent: Jan. 16, 1990

[54] METHOD AND APPARATUS FOR CONSTANT DENSITY RECORDING

[75] Inventors: Al Fischler, San Jose; Ross Wilson, Menlo Park, both of Calif.

[73] Assignee: Maxtor Corporation, San Jose, Calif.

[21] Appl. No.: 50,753

[22] Filed: May 15, 1987

[51] Int. Cl.⁴ .............................................. G11B 5/09
[52] U.S. Cl. ...................................................... 360/51
[58] Field of Search ............................... 360/51, 48, 40

[56] References Cited

U.S. PATENT DOCUMENTS

| | | | |
|---|---|---|---|
| 4,314,287 | 2/1982 | Freeman et al. | 360/51 |
| 4,432,025 | 2/1984 | Grogan | 360/48 |
| 4,714,967 | 12/1987 | Bizjak | 360/48 |

Primary Examiner—Vincent P. Canney
Attorney, Agent, or Firm—Hecker & Harriman

[57] ABSTRACT

Method and apparatus for providing constant density recording is described. A single set of reconfigurable electronics is employed to control the write frequency for a plurality of frequency zones on a magnetic storage disk. The reconfigurable electronics include means for selectively switching a frequency response determining element within a common channel. Switching is controlled by a digital signal provided by a disk file control microprocessor, avoiding the necessity of mechanical linkages and/or changes in spindle rotation rate. The plurality of zones need not be of equal radius in width but the recording frequency within each zone is fixed throughout that zone. Zone selection is under the control of a disk file control microprocessor which produces a digital code to appropriately configure the electronics for the particular zone. Zone switching is done only when a seek across a zone boundary occurs so that no access time penalties result.

5 Claims, 6 Drawing Sheets

Zone - Density - Recording Apparatus

Method for Accomplishing Anticipator Delay and Synthisizer in Single Circuit

Fig. 6
(PRIOR ART)

METHOD AND APPARATUS FOR CONSTANT DENSITY RECORDING

BACKGROUND OF THE INVENTION

1. Field of the Invention

This invention relates to the field of magnetic storage read/write apparatus employing magnetic disks and in particular to method and apparatus for recording information on such disks at a constant density.

2. Background Art

Magnetic disk storage media and apparatus are often utilized in conjunction with computer systems as a means for providing a large amount of accessible and manipulable storage area for the computer. The computer industry has adopted a number of standard sizes for magnetic media storage disks to be used in such systems. For example, 5¼" hard disks are typically employed in Winchester type hard disk drives. It is often desired to provide additional storage capabilities for disk drive systems without increasing the number of disks required or the size of the disks to be used.

In a typical disk storage system, the disk is rotated at a constant frequency. A read/write head flies over the disk surface creating and/or reading magnetic flux reversals in the surface of the rotating disk. Data is stored in a series of concentric tracks on the disk, with the tracks being of increasing diameter away from the center of the disk. If each magnetic flux reversal is considered to be a "bit", then the bit density at an outer data track on the disk will be less than the bit density on an inner track. If the bit density at the inner track is the maximum bit density which may be maintained on the disk, each track away from this inner track will have a bit density below the maximum achievable density. Therefore, if each track could have the same bit density, and that bit density was the maximum achievable, the maximum storage capability of the disk could be achieved. The concept of providing equal bit density in each track of a disk is known as constant density recording.

One prior art method for implementing constant density recording is by means of spindle motor speed variations in direct proportion to head radius, head radius corresponding to the radius of the data track currently being accessed. This method has the disadvantage of the necessity to rapidly alter the speed of the spindle and consequently rotation of the disk, which is incompatible with fast access times.

A second method of constant density recording requires coupling of a potentiometer to the access mechanism of a disk drive in order to define a control voltage proportional to head radius. This voltage is then used to control the recording electronics. However, the attachment of the potentiometer to the access mechanism is undesirable from a cost, size, and reliability stand point.

A third prior art method of constant density recording is the defintion of a plurality of constant density "zones" with a number of redundant recording electronic circuits such that one set of electronics is provided for each recording zone. This method suffers the disadvantage of cost, reliability and size. Further, in addition to the duplicate and redundant channels, switching means must be provided for switching between the channels.

Therefore, it is an object of the present invention to provide a method and apparatus for single channel constant density recording which may be reliably implemented without increasing the size and cost a disk drive system. It is another object of the present invention to provide a method and apparatus for providing constant density recording in which net capacity is independent of record length.

It is yet another object of the present invention to provide method and apparatus for providing constant density recording which results in increased storage capacity over fixed frequency methods.

SUMMARY OF THE PRESENT INVENTION

Method and apparatus for providing constant density recording is described. A single set of reconfigurable electronics is employed to control the write frequency for a plurality of frequency zones on a magnetic storage disk. The reconfigurable electronics include means for selectively switching a frequency response determining element within the common channel. Switching is controlled by a digital signal provided by a disk file control microprocessor, avoiding the necessity of mechanical linkages and/or changes in spindle rotation rate. The plurality of zones need not be of equal radius in width but the recording frequency within each zone is fixed throughout that zone. Zone selection is under the control of a disk file control microprocessor which produces a digital code to appropriately configure the electronics for the particular zone. Zone switching is done only when a seek across a zone boundary occurs so that no access time penalties result.

DETAILED DESCRIPTION OF THE PRESENT INVENTION

A method and apparatus for achieving constant density recording in a magnetic storage read/write apparatus is described. In the following description, numerous specific details such as number of bytes, frequency, number of bands, etc. are set forth in order to provide a more thorough understanding of the present invention. It will be obvious, however, to one skilled in the art, that the present invention may be practiced without these specific details. In other instances, well known features and structures have not been described in detail in order not to unnecessarily obscure the present invention.

Fixed Frequency Recording

In a fixed frequency storage system, the maximum number of data bytes which can be written onto the surface of a disk, BS, is given by multiplying the number of bytes on the ID track, B1 by the number of tracks T1 in a fixed frequency band. Thus, $BS=(T1)(B1)$ Since, for a fixed frequency system, the total number of tracks on the surface, TS, is equal to T1, $BS=(B1)(TS)$ Thus, (B1)(TS) is the surface capacity for fixed frequency recording.

In fixed frequency recording, full use is not taken of the storage capacity of each of the tracks on the disk. In a typical disk storage system, the disk is rotated at a constant speed and therefore the outer track of the disk, having greater circumference, moves faster than inner tracks of less circumference. In a fixed frequency recording scheme, when writing onto an outer track, that track will have the same number of bytes as an inner track, but each byte will take up a greater physical space on the track. This is illustrated in FIG. 6.

Figure 6:
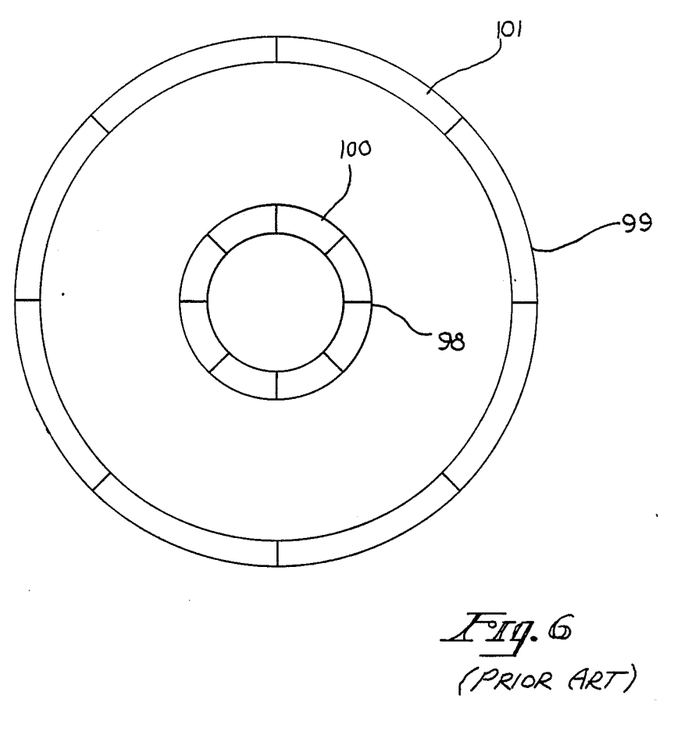
FIG. 6 is a plan view of the magnetic storage disk illustrating a plurality of storage zones.

FIG. 6 is a representation of a fixed frequency recording system. For purposes of example, the frequency of writing bytes onto a disk will be at the rate of 8 bytes per revolution. Byte 100 is representative of a byte on inner track 98, while byte 101 is representative of a byte on outer track 99. The length of byte 100 is given by $\pi R1/4$ where R1 is the radius of inner track 98. The length of byte 101 is given by $\pi R2/4$ where R2 is the radius of outer track 99. Since R2 is greater than R1, the length of byte 101 is greater than the length of byte 100. Thus, the density of bytes on outer track 99 is less than the density of bytes on inner track 98.

Consider for example that R2 equals 2R1. In that situation, the byte density of outer track 99 can be made equal to that of inner track 98 by doubling the write frequency when writing onto outer track 99. Thus, constant density recording can be achieved by varying the frequency of writing information onto the various tracks on a disk.

Constant Density Recording

To calculate BS, the bytes per surface, in a constant density recording scheme, let:
T1=number of tracks per fixed frequency band
B1=number of bytes on the ID track
D=the incremental bytes between adjacent bands
n=the number of bands.
Then $$\begin{aligned}BS &= T1 [B1 + (D + B1) + (2D + B1)\ldots + [(n-1)D + B1]] \\ &= T1 [n B1 + [1 + 2 +\ldots(n-1)] D] \\ &= T1 [n B1 + .5 [n (n-1)] B] \\ &= (n)(T1)[B1 + .5(n-1) D]\end{aligned}$$

If n equals the number of bands and T1 equals the number of tracks per fixed frequency band, then (n)(T1) equals TS, the number of tracks per surface and $BS=(B1)(TS)+0.5(n-1)(D)(TS)$ As noted previous, the term "(B1)(TS)" is the byte capacity for fixed frequency recording (i.e. when n=1). Thus, the term to the right of the plus sign in the above equation represents the additional bytes per surface obtained from employing constant density recording.

Assuming n to be an integer greater than 1, and dividing each side of the equation by (B1)(TS), we see that 0.5 (n−1) D/BS represents the fractional increase in surface byte capacity as a result of employing constant density recording. The maximum capacity increase in bytes per surface is obtained when frequency changes each track, that is when n=TS.

$(n)(D/B1)=2(RO-RI)BPI/2(RI)(BPI)=(RO-RI)/RI=K$

Where RO and RI are the outer and inner track radii for a given disk and $K=(R0-RI)/RI$ Thus, $BS/B1=K/n$.
For very large n $\lim 0.5(n-1) D/B1 = \lim 0.5(n-1) K/n = K/2$ For a typical 3.5 inch storage disk, RO=1.75, RI=0.795 and therefore K=1.2. Hence, the maximum increase in capacity for a 3.5 inch disk is 60%. The following table lists the values of D/B1 and capacity increase 0.5n−1) D/B1) for various values of n.

| n | D/B1 | .5 (n − 1) D/B1 |
|---|------|-----------------|
| 2 | .6   | .3              |
| 4 | .3   | .45             |
| 8 | .15  | .525            |
| 16| .075 | .5625           |

As seen, a 50% increase in this capacity can be achieved by defining as few as 8 frequency bands of recording of a 3.5 inch disk. Note also that increasing the ratio RO/RI increases the capcity of a disk since K is proportional to RO/RI We can now show that the effective number of bytes per surface Bn is independent of record length in a constant density recording system. For a given value of n, the ratio D/B1 is fixed. Let A1 be the number of sectors in the ith band, and S the gross number of bytes per record. (For example, S=317 implies a net record length S' of 256 data bytes with 61 bytes of overhead. If S=573, S' is 512, etc.) So:

$D=B2-B1=S(A2-A1)$ $D/B1=(A2-A1)/A1=(A2/A1)-1$

Let B1=net bytes per surface. Then, $Bn=(S'/S) Bs$ $Bn=B1(S'/S)Ts+0.5(n-1)D(S'/S) Ts$ $Bn=(A1)(S')(Ts)+0.5(n-1)[(A2/A1)-1](A1)(S')(Ts)$ $Bn=(A1)(S')(Ts)[1+0.5(n-1)[A2/A1)-1]]$ Everything to the right of Ts in the above equation is a constant and, since the number of sectors Al is inversely proportional to S', the net capacity Bn is independent of record length. This follows because the value of D/B1 fixes the value of B2=B1+D and assures that B2 is an integral number of sectors. Similarly, for B3, B4, etc.

By way of example, consider a disk drive employing a disk of diameter 3½ inches with a recording system using a (2, 7) code and 13,000 flux changes per inch and 1,300 tracks per inch. A similar analysis could be done for different recording parameters using other codes, such as the (1,7) code. For fixed frequency recording, the highest capacity will occur when the inner track is positioned at a radius of one half that of the outer most track, i.e. RI=0.5(1.75)=0.75. Thus, $B1 = 2RI\pi(\frac{1}{2})(13,000) = 8,934$ bytes per track.

Coded, $B1 = 13,400$ bytes per track $B1 = 13,400(0.875)(1,300) = 15.2$ megabytes per face For a constant density recording system, $BS = (B1)(TS) + 0.5(n-1) D TS$. The inner radius RI in constant density recording can be a variable. Indeed, it is desired to have RI /RO as large as possible to increase capacity. The table below lists the result for RI=0.875 for direct comparison to the fixed frequency case and for RI=0.795 to further increase capacity. In both cases, TPI is 1,300 and B1=13,400 bytes per track.

| n | D/B1 | D | Bs (.795) | Bs (.875) | Bs (.875)/BS (fixed frequency) |
|---|---|---|---|---|---|
| 1 | 0 | 0 | — | 15.2 | 1.0 |
| 2 | .6 | 8040 | 21.6 | 19.8 | 1.3 |
| 4 | .3 | 4020 | 24.1 | 22.1 | 1.45 |
| 8 | .15 | 2010 | 25.3 | 23.2 | 1.53 |
| 16 | .075 | 1005 | 26.0 | 23.8 | 1.57 |

The general equation for the number of sectors per band is given by $$Am = (B1/S)[1 + [M-1]K(n)]$$

Where the index $M = 1, 2, 3 \ldots$ refers to the number of sectors, i.e. A1 in band 1, A2 in band 2, etc. and where the values of K (n) are given below

| N | K (n) |
|---|---|
| 1 | 0 |
| 2 | .6 |
| 4 | .3 |
| 8 | .15 |
| 16 | .075 |

Values in Am are given below with the constraints on A1 for $S = 317$ bytes.

| N = 2 | N = 4 | N = 8 |
|---|---|---|
| A1 = B1/S | A1 = B1/S | A1 = B1/S |
| A2 = [1.6]B1/S = 1.6A1 | A2 = 1.3A1 | A2 = 1.15A1 |
| | A3 = 1.6A1 | A3 = 1.3A1 |
| | A4 = 1.9A1 | A4 = 1.45A1 |
| | | A5 = 1.6A1 |
| | | A6 = 1.75A1 |
| | | A7 = 1.90A1 |
| | | A8 = 2.05A1 |

Thus, for N=2, A1=5, 10, 15, ...; for N=4, A1=10, 20, 30 ...; and for N=8, A1=10, 20, 30, 40 ... As a further example, consider the case where N=8 for record length of 256 and 512 bytes assuming an overhead of 61 bytes and a number of tracks per band equal to 155. The following record lengths will be found for individual bands:

| BAND | 256 BYTES/ RECORD LENGTH | 512 BYTES/ RECORD LENGTH |
|---|---|---|
| B1 | 12,680 | 11,460 |
| B2 | 14,582 | 13,179 |
| B3 | 16,484 | 14,898 |
| B4 | 18,386 | 16,617 |
| B5 | 20,286 | 18,336 |
| B6 | 22,190 | 20,055 |
| B7 | 24,092 | 21,774 |
| B8 | 25,944 | 23,493 |
| Total | 23.98 megabytes /surface | 21.67 megabytes /surface |

The net capacity in both cases is the same, 19.4 megabytes, since $Bn = (S'/S)$ $Bs = (512/573)(21.67) = (256/317)(23.98) = 19.4$ megabytes.

This is compared to the fixed frequency case where $Bn = (512/573) 15.2 = 13.6$ megabytes per surface for a 512 record length and $Bn = (256/317) 15.2 = 12.3$ megabytes per surface for a 256 byte record length.

Thus, constant density recording with as few as 8 bands provides substantial increases in useable capacity over fixed frequency recording regardless of the record length chosen.

Figure 1:
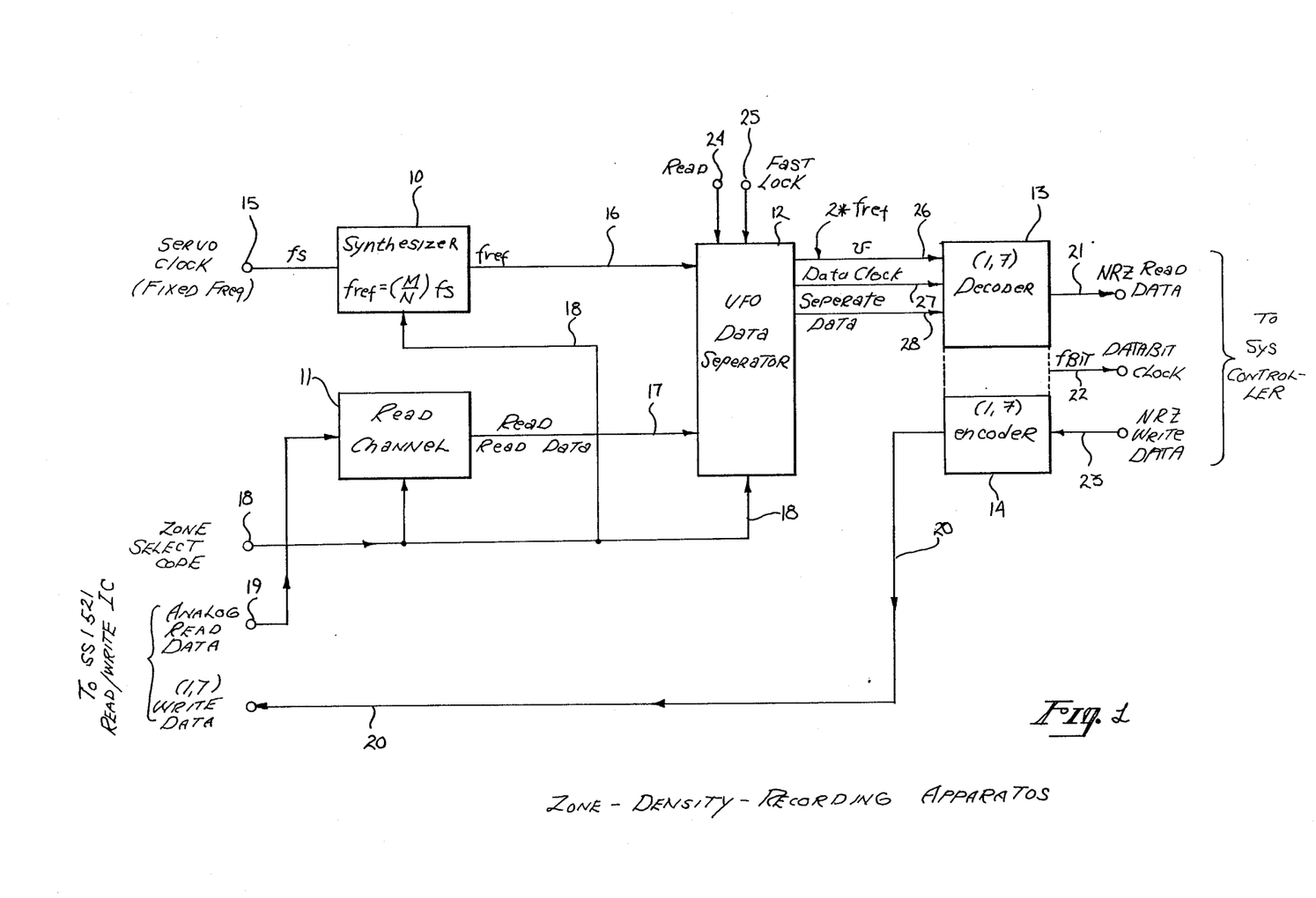
FIG. 1 is a block diagram illustrating the preferred embodiment of the circuitry of the present invention.

Circuitry for implementing the constant density recording scheme of the present invention is illustrated in FIG. 1. Implementation of this constant density recording scheme is by means of a read channel having the ability to switch between several filters, each of which is optimized for a particular frequency zone or zones. A VFO data separator employs a single oscillator having both fine and coarse frequency control capabilities. The coarse control is by means of a digital to analog converter whose output is determined by the particular zone being accessed. Fine control is accomplished using a conventional phase detector referenced to incoming read data received from the read channel.

For purposes of implementation, it is assumed that the recording disk is divided into a fixed number of concentric zones, or bands, of recording tracks. As noted previously, the zones need not be of equal radial width. The recording frequency within each zone is fixed throughout that zone and is selected to achieve maximum data capacity. Zone selection is under control of a disk file control microprocessor which emits a digital code in order to alert the read channel 11 illustrated in FIG. 1 so that it may be configured for the appropriate zone. The zone code may be provided by a processor which compares the track number to a look-up table having the zone assignments for each track of the disk. Any other suitable method of providing the zone code may be implemented in the present invention.

Referring again to FIG. 1, a servo clock provides a fixed frequency FS 15 to synthesizer 10. Synthesizer 10 multiplies FS 15 to a reference frequency FREF 16 whose values depends upon the particular zone currently accessed by read/write heads of the disk drive. A zone select code 18 is coupled to synthesizer 10. The analog read data 19 is coupled to read channel 11 along with zone select code 18. Read channel 11 outputs a digital read data signal 17 which is inputted along with zone select code 18 to variable frequency oscillator (VFO) data separator 12. Also inputted to VFO 12 is FREF 16. Read control signal 24 and fast lock signal 25 are also inputted to VFO 12. VFO 12 outputs 2FREF 26 which is twice the frequency of FREF 16, a data clock signal 27 equal to FREF 16 and separated data 28 to decoder 13. The decoder 13 outputs NRZ (nonreturn to zero) read data 21 and FBIT 22 a data bit clocked to a system controller.

In operation, a zone select code 8 is transmitted to the read channel 11 and to synthesizer 10. A zone select code is utilized to generate a reference frequency FREF 16 appropriate to the particular zone being accessed. The synthesizer 10 outputs appropriate reference frequency FREF 16 to VFO data separator 12. The VFO data separator 12 phase locks to this reference FREF 16 when it is not reading in order to generate a stable clock for writing, and to hold an idle frequency near to that of the read data. FREF is at the cell rate of the code chosen for use. In the case of the ⅔ rate (1, 7) code, FREF=1.5 FBIT, where FBIT is the data bit rate for the selected band.

During write operations, the VFO/data separator locks in a phase frequency lock loop to the FREF input and delivers clocks at frequencies FREF and 2 times FREF to the encoder. The encoder delivers a data bit rate clock FBIT to the system controller for the purpose of clocking NRZ write data into the encoder. The encoder receives the NRZ write data and performs the two data-bit to three code-bit mapping required by the 1, 7 code and delivers (1, 7) write data at code cell rate to the write toggle in the read/write preamp IC. This IC could be the 521 device manufactured by Silicon Systems, Inc., but any suitable read/write preamp may be utilized.

In the read operation, the read channel receives analog read data from the read/write preamp IC, applies AGC in order to stabilize signal amplitude, then processes the signal using a two-path differentiator/clip channel. Frequency response characteristics of the channel filter are adjusted for the specific band by means of a switch filter arrangement.

Digitized read data pulses from the read channel are applied to the VFO which standardizes the read pulses to a phase-locked-oscillator-generated clock slaved to the incoming data pulse. Fast PLO acquisition to incoming data is accomplished by switching the charge pump into a high current mode and changing the loop filter pulse/zero location. This procedure effectively raises loop band width to ensure rapid phase acquisition. During acquisition, the loop phase detector is operated in phase/frequency mode until acquisition is complete. The detector reverts to phase only mode for the duration of the read operation.

VFO control frequency during both read and write operations is stepped in coarse fashion to the vicinity of the desired operating point by means of a digital to analog converter under control of the zone select code. Fine phase/frequency control required by phase lock loop action is accomplished by the output of the charge pump/loop filter.

The 1,7 decoder functions in read operations to transform the 1, 7 code bit stream provided by the data standardizer in the VFO data separator into uncoded NRZ data for application to the system controller on line 21.

Figure 2:
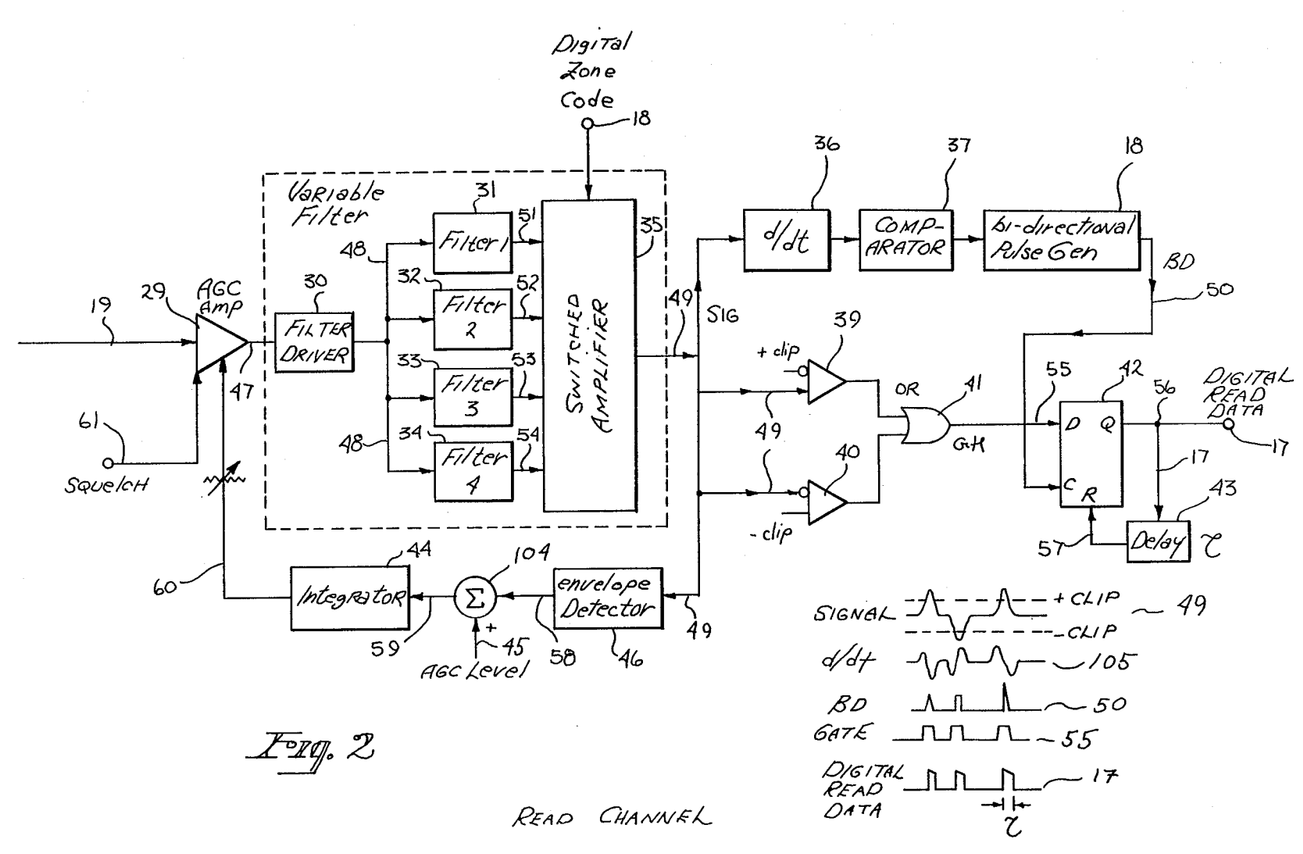
FIG. 2 is a block diagram illustrating the read channel of FIG. 1.

Referring to FIG. 2, the read channel 11 is shown in detail. The analog read data 19 is coupled through an automatic gain control (AGC) amplifier 29. The output 47 of AGC 29 is inputted to filter driver 30 whose output 48 is coupled to a plurality of filters 31-34. The outputs 51-54 of filters 31-34 are coupled to switch amplifier 35. Also inputted to switched amplifier 35 is a two bit digital zone code 18 which controls the switched amplifier 35 so that frequency response characteristics may be adjusted for the specific zone being read. The output 49 of switched amplifier 35 is configured in a two path clip/differentiator arrangement.

The differentiator path consists of differentiator 36, whose output is coupled through comparator 37 to bidirectional pulse generator 38. The clip path of output 49 is coupled to the inverting input of comparator 39 and the noninverting input of comparator 40. The remaining inputs to comparators 39 and 40 are dc levels which establish clip levels. The outputs of comparators 39 and 40 are coupled to OR gate 41 and the output 55 of the OR gate 41 is coupled to flip flop 42 along with the output 50 of bidirectional pulse channel 38. The output of flip flop 42 at node 56 is taken as the digital read data signal 17. A phase delay 43 is also coupled to node 56 in feedback fashion to the reset of input 42.

The output 49 of switched amplifier 35 is also coupled to an envelope detector 46. The envelope detector delivers a level on line 58 which tracks the envelope of the signal on line 49. The output 58 of envelope detector 46 is summed with dc AGC level 45 at summing node 104 whose output 59 is coupled to integrator 44. The output of integrater 44 is applied as a gain control input to AGC amplifier 29 over line 60. AGC again forces the amplitude of the signal on line 49 to a fixed relationship with dc level on line 45, thus regulating the amplitude of signal 45 to a fixed level. Also coupled to AGC amplifier 29 is squelch signal 61. The squelch signal assists rapid recovery of AGC amplifier 29 after transients associated with write operations.

In the preferred embodiment of the present invention, there is one filter for each two frequency zones utilized in reading and writing information from a storage disk. Two bits of the digital zone select code ar utilized to select the appropriate filter 31-34 for each zone. The selected filter and switch amplifier 35 optimize the frequency-response characteristics of output signal 49 to differentiator 36 and clipping amplifiers 39 and 40. Differentiator 36 detects zero crossings of signal 49 and outputs differentiated signal 105 to comparator 37 and bidirectional pulse generator 18. The output 50 of bidirectional pulse generator 18 is inputted to the clock input of flip flop 42.

Clipping amplifiers 39 and 40 act a threshold detectors of signal 49 output from switched amplifier 35. The threshold detection operation improves channel performance by rejecting spurious pulses produced by differentiater 36 and comparator 37 during baseline areas of signal 49. Such effects are aggravated by use of codes having long run lengths such as the 1,7 code used herein. As noted previously, the outputs of clipping amplifiers 39 and 40 are inputted to OR gate 41. The output 55 of OR gate 41 is the data input of flip flop 42. The output of flip flop 42 at node 56 is the digital read data output 17, a digitized version of the analog read signal input to the read channel.

Figure 4:
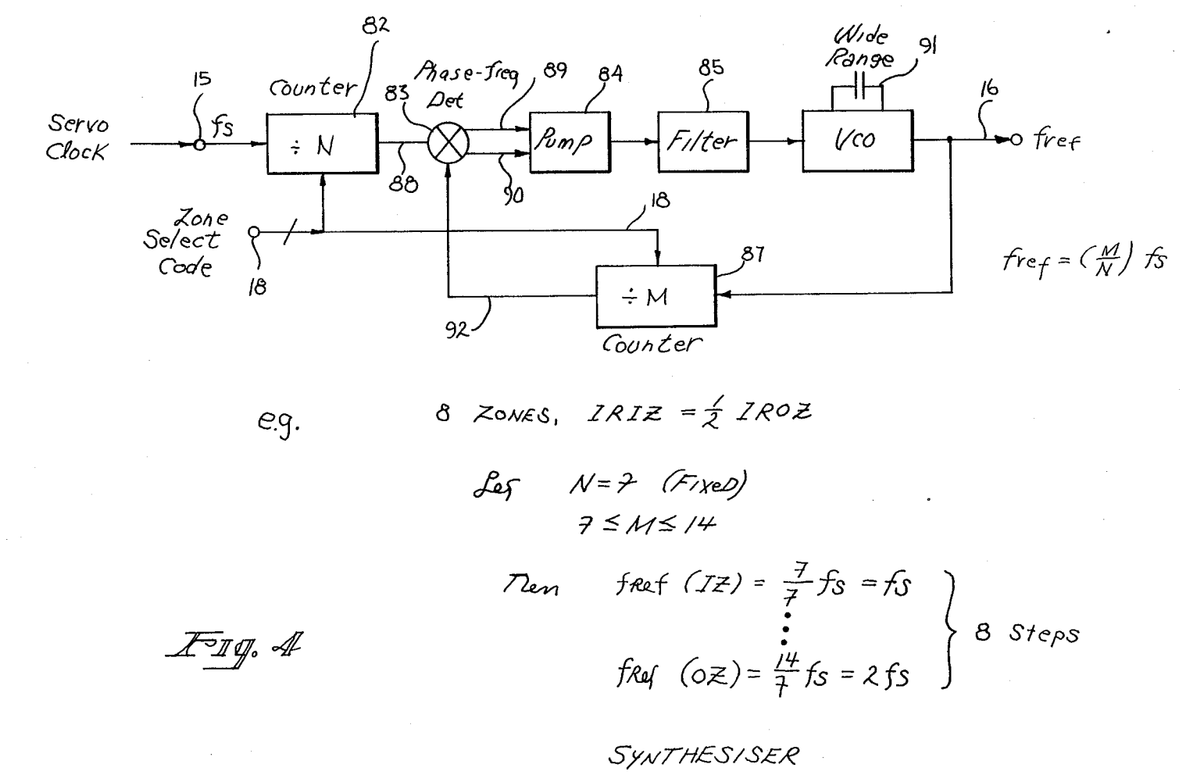
FIG. 4 is a block diagram illustrating the synthesizer of FIG. 1.

The synthesizer 10 is shown in detail in FIG. 4. The servo clock outputs a fixed frequency 15 to counter 82 which performs a divide N function. Zone select code 18 is inputted to counter 82 to provide N. In the 8 zone arrangement of the preferred embodiment, N is fixed and is equal to 7. The output 88 of counter 82 is inputted to phase-frequency detector 83.

The output of phase frequency detector 83 is coupled on lines 89 and 92 to charge pump 84. The output of charge pump 84 is coupled through filter 85 to voltage control oscillator (VCO) 86. The range of VCO 86 is set by feedback capacitor 91. The output of VCO 86 is FREF 16. FREF 16 is coupled in the feedback loop to counter 87 which performs a divide by M function. The value of M is specified by three bits of zone select code 18 inputted to counter 87. The output 92 of counter 87 is coupled to phase frequency detector 83. The overall effect of this configuration is to provide an output frequency FREF which is (M/N) times the input frequency FS.

In the preferred embodiment of the present invention, 8 zones are utilized. Letting N=7, then 7 is less than or equal to M which is less than or equal to 14. FREF is equal to (M/N) (FS). Therefore FREF 16 is in the range of FS to 2FS.

Figure 3:
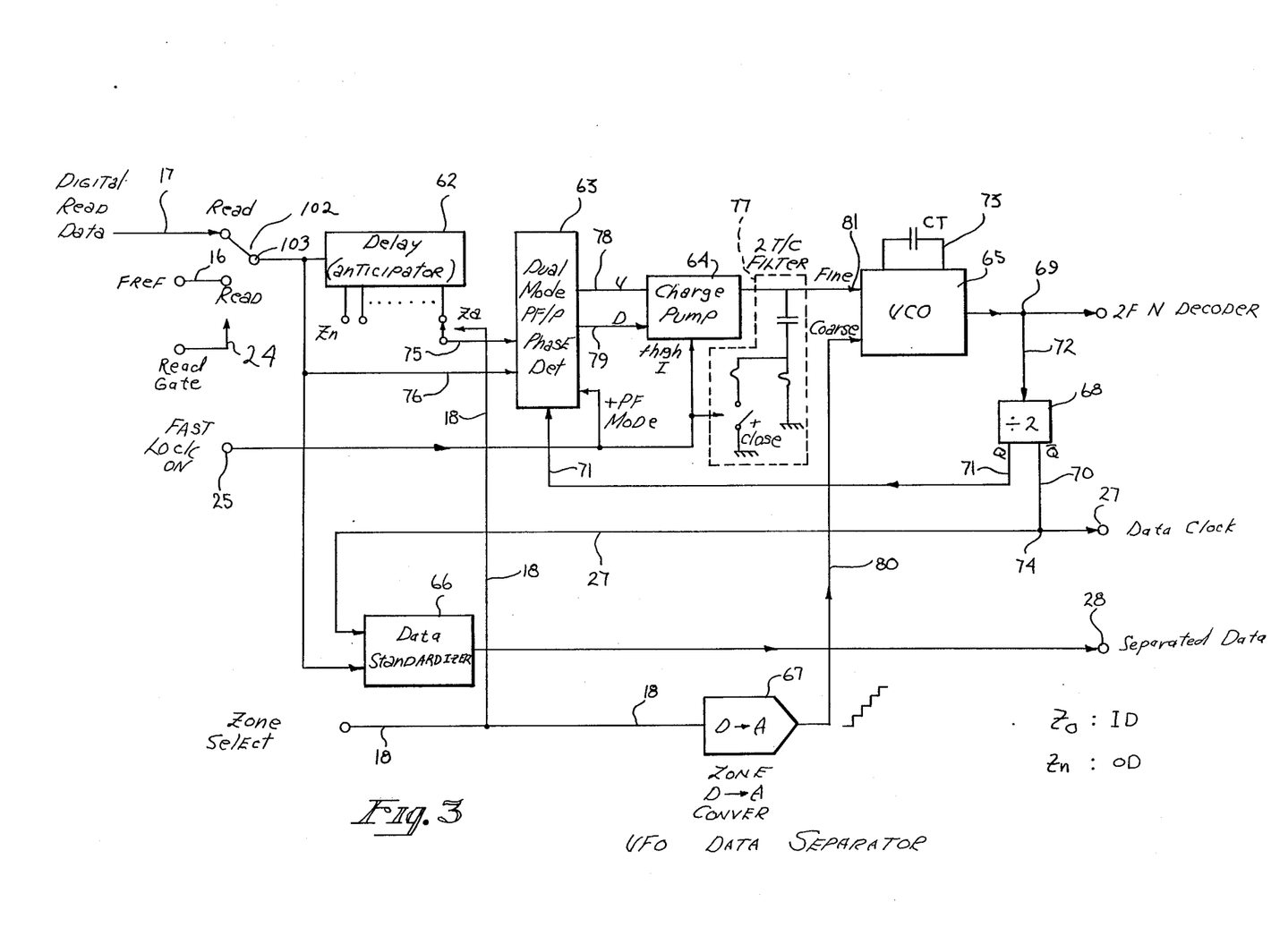
FIG. 3 is a block diagram illustrating the VFO data separator of FIG. 1.

Referring to FIG. 3, VFO 12 is shown in detail. The digital read data signal 17 from read channel 11 is inputted through switch 102 to delay line (anticipator) 62. FREF 16 is also coupled through switch 102 to delay 62. Read control 24 is applied to switch 102 to select Digital Read Data on line 17 during read operations, and to select FREF on line 16 at other times. The delay 62 is coupled to switch 102 at node 103. Node 103 is also coupled to phase detect 63 and standardizer 66. Zone select code 18 is coupled to delay 62 and selects a tap weight Za-Zn depending upon the input of zone code 18. The output 75 of delay 62 is coupled to dual-mode phase-frequency detector 63. Output U78 and D79 of phase detector 63 is inputted to charge pump 64 along with fast lock-on signal 25. Fast lock-on control signal 25 is also coupled to phase detector 63. The output of charge pump 64 is coupled through a dual time-constant filter 77 to a voltage control oscillator 65. The output 81 of filter 77 is the fine frequency control signal of the present invention. Coarse control signal 80 is generated by inputting zone control signal 18 to digital to analog converter (D/A) 67. The output 80 of D/A 67 is the coarse frequency control signal. D/A 67 is the coarse frequency control.

These signals 80 and 81 are inputted to voltage control oscillator (VCO) 65 whose range is controlled by capacitor 73. The output of VCO 65 at node 69 is taken as 2FREF 26. Node 69 is also coupled to line 72 to divider 68 which divides it by two and outputs signal 70 and 71 which are the inverse of each other. Output 70 and node 74 is taken to be data clock signal 27. Node 74 is also coupled to standardizer 66 whose output is separated data 28. Output 71 of divider 68 is coupled to phase detector 63 in order to close the feedback loop.

The VFO is used to establish a decode window to separate the data from the read channel. In order to do this, a phase-lock oscillator technique is used which is sensitive only to phase variation of Digital Read Data 17 and which ignores frequency variation. In order to implement such a phase-lock oscillator, the loop phase detector must be provided with an anticipater which causes phase comparisions to be made only when data pulses are present. This anticiipater requires that a delay be provided which is one-half code-bit cell in length. Because the present invention utilizes a plurality of read/write frequencies, the amount of delay must correspondingly vary. Therefore, the zone select code configures delay line 62 to provide the appropriate amount of delay to the phase detecter anticipator. The VFO data separator is a phase locked loop. Therefore VCO 65 should be set with a center frequency approximating that of the desired zone in order to reduce delays in phase frequency locking. To accomplish this, zone select code 18 is input to digital to analog converter (D/A) 67. The output of D/A 67 is a rough approximation of the center frequency of the desired zone and is input on line 82 to VCO 65. In this manner, the fine frequency lock accomplished by the feedback loop may be achieved more quickly. The presence or absence of a data pulse from digital read data signal 17 is determined by the phase detect portion of phase frequency detector 63 In an embodiment of the present invention, the decode window is set by a VCO clock signal which is twice the frequency of the bit rate. This VCO clock signal 2FREF is taken from node 69 and coupled to decoder 13 (FIG. 1).

Still referring to FIG. 3, the VCO clock signal output at node 69 is also coupled to divide by two circuits 68 with the output 71 being fed back to phase detect 63 for frequency locking purposes. If the circuit is in the write mode, switch 102 is coupled to the FREF signal 16 so that data clock signal 27 may be generated.

Figure 5:
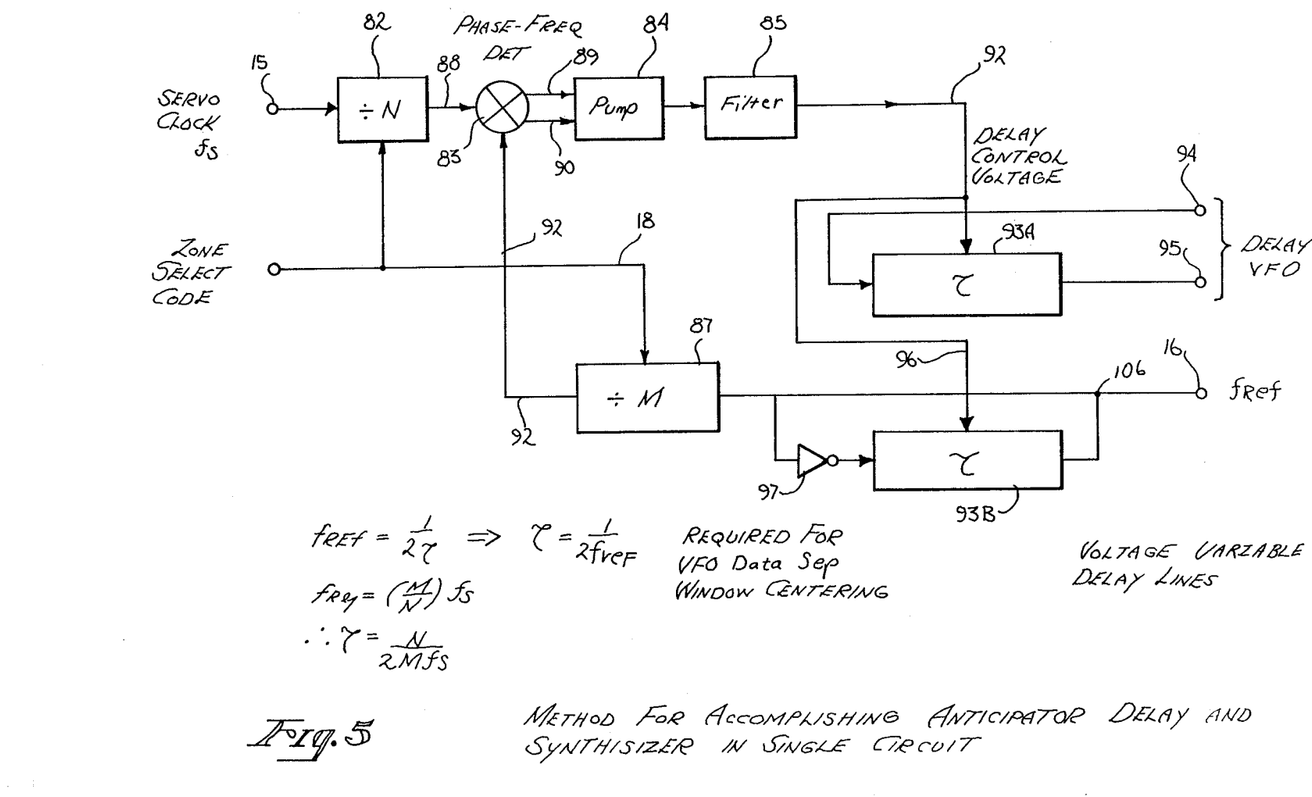
FIG. 5 is a block diagram illustrating a method for accomplishing anticipator delay and synthesizer in a single circuit.

An alternate and preferred method for accomplishing anticipator delay and the synthesizer in a single circuit is illustrated in FIG. 5. Servo clock signal FS 15 is inputted to divide N 82. Zone select code 18 is also inputted to divider 82 whose output 88 is coupled to phase frequency detector 83. The output of phase frequency detector 83 is outputted on lines 89 and 90 to charge pump 84 whose output is coupled through filter 85 on line 92 to matched voltage-variable delay lines 93A and 93B. These two delay lines are matched by virtue of fabrication on a common silicon chip, and are implemented as a cascade of variable risetime amplifier stages. Also inputted to delay line 93A are signals 94 and 95. The output 106 of delay line 93B is connected back to the input of delay line 93B via logic inverter 97 to form a self-oscillating ring oscillator. Output 106 of delay line 93B is also applied as an input to divide M 87 and is brought out to terminal 16 as frequency FREF. Zone select code 18 is also coupled to counter divide M 87 in order to establish the division factor. The output 92 of divide M 87 is coupled to phase frequency detector 83.

The embodiment of FIG. 5 consolidates the anticipator functions of the VFO data separator PLO and the synthesizer of FIG. 1. The servo clock is input to the divide N circuit 82 (fixed at 7 in the preferred embodiment). The output of the divide M circuit 87 is coupled to the phase frequency detect 92 and combined with the divide N output 88 so that FREF 16 is equal to (M/N) FS. The output of phase frequency detect circuit 83 is coupled to charge pump 84 and filter 85 as described with respect to FIG. 4. The output of filter 85, instead of being coupled to a voltage controlled oscillator, is coupled to a pair of matched delay lines 93A and 93B. Because delay line 93B is connected as a self-oscillating ring oscillator, its frequency of oscillation will be controlled by delay control voltage 92. The resultant oscillation frequency FREF will thus be forced by phase-lock loop action to be (M/N) FS. Therefore, because delay lines 93B, 93A are matched, delay line 93A will automatically be regulated to yield a delay of one-half period of FREF. This delay will be interposed between terminals 94 and 95, and is the required anticipator delay.

Thus, a method and apparatus for providing as constant density recording scheme for use in data storage applications has been described.

We claim:
1. A circuit for reading and writing data with a read/write head at a plurality of constant frequency zones on a data storage disk comprising:
  identifying means coupled to said read/write head for detecting a first identification signal identifying a track of said storage disk and assigning one of a plurality of zone select codes to said track, each zone select code corresponding to one of said constant frequency zones;

clock signal generating means coupled to said zone select code and to a first clock signal having a first frequency, said clock signal generating means outputting a second clock signal having a second frequency dependent on said zone select code such that a different frequency is produced for each said constant frequency zones;

data separating means coupled to said second clock signal for defining data recovery windows for separating data during a read operation, said data separating means outputting a data clock for controlling the frequency of a write operation;

a read channel coupled to said read/write head and to said data separating means for converting analog data signals into digital data signals;

encoding means coupled to said data separating means for writing data at a frequency corresponding to said second frequency;

decoding means coupled to said data separating means for reading data from said constant frequency zones of said data storage disk at said second frequency;

said zone select code comprising a digital code having a numerical value dependent on said constant frequency zone;

said clock signal generating means comprising means for multiplying said first clock signal by a weighting factor corresponding to said numerical value of said zone select code;

said data separating means comprising a variable frequency oscillator (VFO) and said data separating means may be selectively coupled to said clock signal generating means and said read channel;

said data separating means further including a digital to analog converter coupled to said zone select code, said digital to analog converter having an output defining a center frequency of a voltage controlled oscillator (VCO).

2. The circuit of claim 1 wherein said constant frequency zones are such that all of said zones have an equal data density.

3. The circuit of claim 2 wherein said plurality of constant frequency zones comprises 8 constant frequency zones.

4. A circuit having a single channel for reading and writing data with a single read/write head at a plurality of constant frequency zones on a data storage disk comprising:

identifying means coupled to said read/write head for detecting a first identification signal identifying a track of said storage disk and assigning one of a plurality of zone select codes to said track, each zone select code corresponding to one of said constant frequency zones;

clock signal generating means coupled to said zone select code and to a first clock signal having a first frequency, said clock signal generating means outputting a second clock signal having a second frequency dependent on said zone select code such that a different frequency is produced for each of said constant frequency zones; said clock signal generating means comprising a frequency synthesizer;

data separating means coupled to said second clock signal for defining data recovery windows for separating data during a read operation, said data separating means outputting a data clock for controlling the frequency of a write operation, said data separating means comprising a variable frequency oscillator (FFO);

a read channel coupled to said read/write head and to said data separating means for converting analog data signals into digital data signals;

encoding means coupled to said data separating means for writing data at a frequency corresponding to said frequency;

decoding means coupled to said data separating mean for reading data from said constant frequency zones of said data storage at said second frequency;

coarse frequency control means included in said VFO coupled to said zone select code and a fine frequency control means coupled to said read channel and said zone select code;

said fine frequency control means comprising a phase/frequency loop phase detector;

said coarse frequency control means comprising a digital-to-analog converter coupled to a voltage controlled oscillator (VCO);

said VFO further including an anticipator coupled to said read channel to provide a delay of approximately one half bit-cell in length in read data.

5. A circuit having a single channel for reading and writing data with a single read/write head at a plurality of constant frequency zones on a data storage disk comprising:

identifying means coupled to said read/write head for detecting a firs identification signal identifying a track of said storage disk and assigning plurality of zone select codes to said track, each zone select code corresponding to one of said constant frequency zones;

clock signal generating means coupled to said zone select code and to clock signal having a first frequency, said clock signal generating means outputting a second clock signal and a delay clock signal each having a frequency dependent on said zone select code such that a different frequency is produced for each of said constant frequency zones;

data separating means coupled to said second clock signal and said delay clock signal for defining data recovery windows for separating data during a read operation, said data separating means outputting a data clock for controlling the frequency of a write operation;

a read channel coupled to said read/write head and to said data separating means for converting analog data signals into digital data signals;

encoding means coupled to said data separating means for writing data at a frequency corresponding to said frequency;

decoding means coupled to said data separating means for reading data from said constant frequency zones of said data storage disk at said second frequency;

said clock signal generating means comprising a frequency synthesizing means coupled to said first clock signal and providing a first output signal, a dividing means coupled to said zone select code and providing a second output signal, first and second delay lines coupled to said first output signal and providing third and fourth output signals respectively, said fourth output signal coupled in a feedback loop to said second delay line.

* * * * *

UNITED STATES PATENT AND TRADEMARK OFFICE
CERTIFICATE OF CORRECTION

PATENT NO. : 4,894,734
DATED : January 16, 1990
INVENTOR(S) : Fischler et al.

It is certified that error appears in the above-identified patent and that said Letters Patent is hereby corrected as shown below:

In the drawings, sheet 1, Figure 1, delete the phrase,"read read data",
associated with signal 17, and insert in place thereof
--digital read data--;
delete the word "APPARATOS" associated with the title of Figure 1, and insert in place thereof --APPARATUS--.
In the drawings, sheet 2, Figure 2, the element number "18" associated with the bi-directional pull generator block should be deleted, and insert in place thereof --38--.
In the drawings, sheet 4, Figure 4, insert element number --86-- adjacent to the VCO block of Figure 4.
In the drawings, sheet 5, Figure 5, delete element number "92" associated with the output of filter 85, and insert in place thereof --96--.
In column 2, line 1, after the word "cost", insert --of--.
In column 3, line 59, delete "previous", and insert in place thereof --previously--.
In column 4, line 1, after the word "changes", insert --with--;
line 17, delete "0.5 n-1) D/B1)", and insert in place thereof --0.5 (n-1) D/B1
line 29, delete "capcity" and insert in place thereof --capacity--;
line 30, a period should be added after the term "RI";
line 43, after the word "let" delete "B1" and insert in place thereof --Bn--;
line 50 delete "Bn=(A1)(S')(Ts)[1 + 0.5 (n-1)[A2/A1)-1]]", and insert in place thereof --Bn=(A1)(S')(Ts)[1 + 0.5 (n-1)[ (A2/A1)-1]]--.
In column 5, lines 34, 43, 52, 53 and 54, for the letter "N", each occurrence, should read --n--;
line 53, "10", second occurrence, should be deleted.
In column 6, line 67, the number "8", should be deleted and insert in place thereof --18--.
In column 7, line 62, delete "switch" and insert in place in thereof --switched--.
In column 8, line 10, delete "channel", and insert in place thereof --generator--;
line 20, delete "integrater", and insert in place thereof --integrator--;
line 33, delete "switch", and insert in place place thereof --switched--;

UNITED STATES PATENT AND TRADEMARK OFFICE
CERTIFICATE OF CORRECTION

PATENT NO. : 4,894,734

DATED : January 16, 1990

INVENTOR(S) : Fischler et al.

It is certified that error appears in the above-identified patent and that said Letters Patent is hereby corrected as shown below:

(Column 8 cont'd)
    line 39, delete "18", and insert in place thereof --38--;
    line 41, delete "a", and insert in place thereof --as--;
    lines 44 and 45, delete "differentiater", and insert in place thereof --differentiator--;
    line 62, delete "92", and insert in place thereof --90--.
In column 9, lines 16 and 48, "Digital Read Data" should read --digital read data--
    lines 51 and 59, "detecter" should read --detector--;
    lines 51 and 53, "anticipater" and "anticiipater" should read --anticipator--
    line 67 delete "82" and insert in place thereof --80--.
In column 10, line 23, delete "92" and insert in place thereof --96--;
    line 42, delete "92" and insert in place thereof --83--;
    line 51, delete "92" and insert in place thereof --96--.
In claim 4, column 12, line 4, delete "(FFO)" and insert in place thereof --(VFO)--
In claim 5, column 12, line 31, delete "firs", and insert in place thereof --first--;
    line 37, after the word "to", insert --a first--.

Signed and Sealed this

Fifth Day of October, 1993

*Attest:*

BRUCE LEHMAN

*Attesting Officer*      *Commissioner of Patents and Trademarks*